W. STOCKTON.
Water-Closets.
No. 155,814. Patented Oct. 13, 1874.
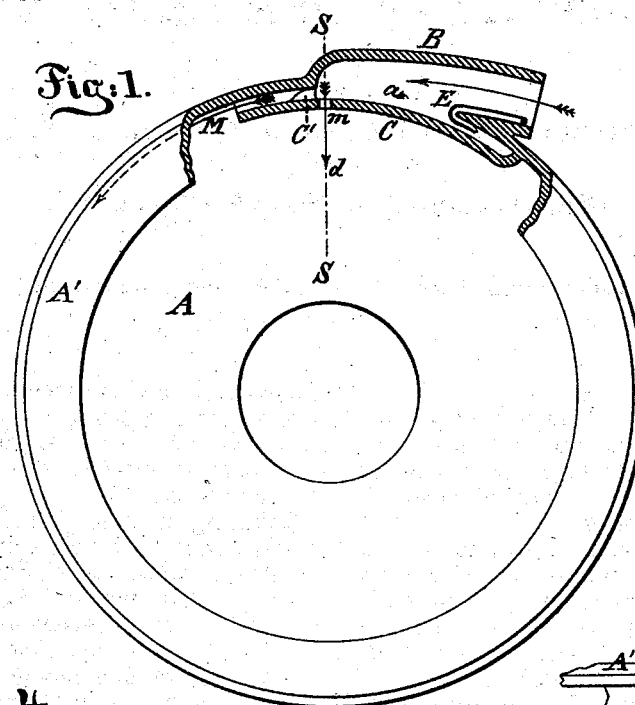
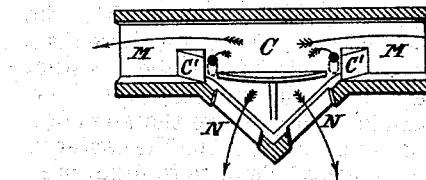
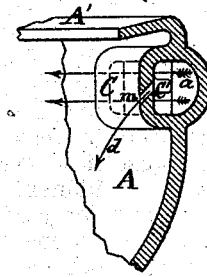
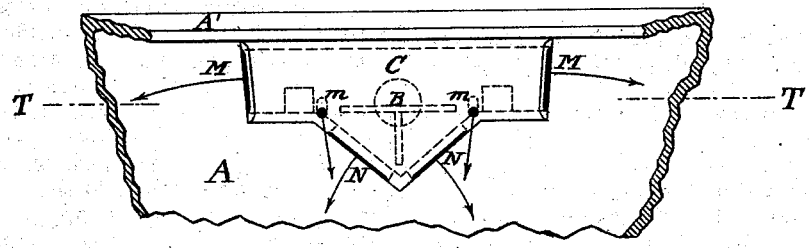
Witnesses:
Inventor:
W. Stockton

UNITED STATES PATENT OFFICE.

WILLIAM STOCKTON, OF NEW YORK, N. Y.

IMPROVEMENT IN WATER-CLOSETS.

Specification forming part of Letters Patent No. 155,814, dated October 13, 1874; application filed August 25, 1874.

*To all whom it may concern:*

Be it known that I, WILLIAM STOCKTON, of New York city, in the State of New York, potter, have invented certain Improvements relating to Water-Closet Basins, of which the following is a specification:

I have in my experiments operated on what are known as French basins, the material of which is white crockery. The invention is more particular adapted for work in that material, but I believe it may be carried out with some success in enameled cast-iron and various other materials. To avoid the labor of excavating the usual groove part way around under the rim, and avoid the weakening of the structure thereby occasioned, I hold the water up and cause it to whirl around with proper force by a different construction. I also provide means for jetting one or more small streams into the space near the center of the bowl for the purpose of more rapidly wetting down the paper or other material there.

The following is a description of what I consider the best means of carrying out the invention.

The accompanying drawings form a part of this specification.

Figure 1 is a plan view of the approved bowl, with a portion broken away to show a horizontal section through the parts which involve novelty. Fig. 2 is a vertical section through the novel portion on the line S S in Fig. 1.

The above represents the invention as adapted for the tangential water connection, or what is known in the trade as the "circular supply." The remaining figures represent a modification adapted for what is known in the trade as the "straight supply."

Fig. 3 is a view of a portion from the interior of the bowl; and Fig. 4 is a view of the fan or spreader prepared in a separate piece, and adapted to be "bossed in" and united to the main bowl, so as to form a single piece of crockery therewith. Fig. 5 is a horizontal section on the line T T in Fig. 3.

Similar letters of reference indicate corresponding parts in all the figures.

A is the main body of the bowl, and A' is the ordinary internal rim at the top. B is the exterior nozzle formed in a separate piece, and applied by wetting and joining in the ordinary way. C is an internal addition molded in a separate piece, and similarly joined to the main body.

Referring to Figs. 1 and 2, the tangential supply-nozzle B extends a little distance along the surface of the bowl, and then rounds off rapidly. A sufficient length of juncture is formed to allow a capacious hole, $a$, through which the water may move freely inward without any sudden change of direction, and come within my peculiar spreader and showeret C. This latter begins a little in advance or nearer the source of the water than the commencement of the hole $a$, and extends a sufficient distance beyond it to allow a stud, C', to be formed in the spreader C, and extending internally relatively to the spreader, but in the direction away from the center of the bowl to a sufficient distance to form, preferably, a contact with the interior surface of the bowl. This latter is not essential. It is important that it projects a sufficient distance into the stream of water to arrest the motion of a small portion. A hole, $m$, is formed through the spreader and showeret C just before the stud C'. The water arrested by the stud is jetted inward in a smooth round stream a little above the center of the basin. In case the plumber wishes to apply his ordinary sharply-bent metal or hook within the supply-nozzle, to aid in retaining his lead-pipe connection to the crockery, he can introduce it in the hole $a$, as indicated by E. The water introduced through the nozzle is restrained by the small area of the final orifices $m$ M. The central jet $d$ should be only a little more than an eighth of an inch in diameter. The tangential aperture M, through which the water is discharged at the farther end of the inner addition C, is of moderate area. Both orifices together are of something less area than the supply pipe. The water consequently maintains a high pressure within the addition C, and spurts with force through the two apertures.

Referring to the modification in Figs. 3, 4, and 5, the nozzle B delivers the water with a direct inward movement against the inner face of a double piece having the peculiarities of my spreader and showeret C in duplicate. This is provided with two tangential delivery apertures, M, and with two of the orifices $m$, and with two of the studs C′, each of which performs the functions, before described, of arresting a portion of the stream, and causing it to jet with more vigor through the nearly radial hole $m$ adjacent thereto. I provide also in this form of the spreader and showeret C a deep space in the center, with additional spreading apertures N, adapted to wash the surface of the bowl below where the water is received. I make these latter orifices of small area, and, to further check the discharge through them, I prevent the full pressure of the water thereon by producing raised webs or ribs on the inner face of the spreader and showeret C, as clearly shown in Fig. 5.

I claim as my invention—

1. In combination with the main bowl A, tangential receiving-nozzle B, and connecting opening $a$, the spreader and showeret C, formed in one with the bowl, and adapted to confine the water and project it circularly from the aperture M, as and for the purposes herein specified.

2. The internal piece C, having the hole $m$ and adjacent stud C′, arranged to operate relatively to the current of water, as herein specified.

In testimony whereof I have hereunto set my hand this 22d day of August, 1874, in the presence of two subscribing witnesses.

WM. STOCKTON.

Witnesses:
　JOHN NIXON,
　WILLIAM JACKSON.